United States Patent [19]

Shibata et al.

[11] 4,025,603

[45] May 24, 1977

[54] METHODS OF PURIFYING GAS CONTAINING NITROGEN OXIDE, AND COMPOSITIONS USED THEREFOR

[75] Inventors: Tsuneo Shibata, Yamatokoriyama; Masao Maki, Nabari; Masao Suzuki, Nara; Hidehiko Kawabe, Kashiwara, all of Japan

[73] Assignee: Matsushita Electric Industrial Co., Ltd., Kadoma, Japan

[22] Filed: Oct. 21, 1974

[21] Appl. No.: 516,869

[30] Foreign Application Priority Data

Oct. 19, 1973 Japan .............................. 48-118281
Dec. 18, 1973 Japan .............................. 48-142889
Dec. 28, 1973 Japan ................................ 49-2897

[52] U.S. Cl. ................. 423/239; 423/235
[51] Int. Cl.² .......................................... B01D 53/04
[58] Field of Search .......... 423/212, 235, 239, 395, 423/400

[56] References Cited

UNITED STATES PATENTS

| | | |
|---|---|---|
| 1,092,295 | 4/1914 | Schloesing ........................ 423/235 |
| 1,115,164 | 10/1914 | Bosch et al. ........................ 423/395 |
| 2,684,283 | 7/1974 | Ogg et al. ............................ 423/239 |
| 3,348,914 | 10/1967 | Quanquin et al. .................. 423/235 |
| 3,382,033 | 5/1968 | Kitagawa ............................ 423/239 |
| 3,498,743 | 3/1970 | Kyllonen ............................ 423/239 |
| 3,904,739 | 9/1975 | Uehara et al. ...................... 423/400 |

FOREIGN PATENTS OR APPLICATIONS 678,326  3/1930  France

*Primary Examiner*—G. O. Peters
*Attorney, Agent, or Firm*—Wenderoth, Lind & Ponack

[57] ABSTRACT

In removing nitrogen oxide from a gas containing it, the gas is passed through a region where at least one of calcium sulfate and calcium hydroxide coexists with powerful oxidation agents such as sodium chlorite, potassium permanganate, etc. thereby removing the nitrogen oxide, mainly nitrogen monoxide, from the gas. This method is very effective in purifying exhaust gases resulting from burning operations, since 80 to 90% or more of the nitrogen oxide contained in the exhaust gases is nitrogen monoxide. In addition, this method is also effective in purifying indoor air.

6 Claims, 16 Drawing Figures

METHODS OF PURIFYING GAS CONTAINING NITROGEN OXIDE, AND COMPOSITIONS USED THEREFOR

The present invention relates to methods for purifying a gas by removing nitrogen oxide, mainly nitrogen monoxide, from the gas containing the nitrogen oxide harmful to human bodies; and to compositions used therefor. Especially, the present invention is intended to purify exhaust gas from burning operations and to purify indoor air. In recent years, atmosphere pollution has been caused by gases emitted from various types of combustors. Especially, photochemical smogs have become a big problem. The nitrogen oxide component of these gases produces a serious problem. 80 to 90% or more of the nitrogen oxide contained in the gases emitted from the combustor is nitrogen monoxide. Removal of the nitrogen monoxide is a big problem yet to be solved.

Conventionally, there have been known a contact reduction method, an adsorption method, an absorption method, etc. as methods for removing the nitrogen oxide from the gases. However, there have been many problems in practical uses thereof. Namely, according to the contact reduction method, reducing agents such as CO, $NH_3$, hydrocarbons, $H_2S$, etc. are used. The reducing agents are reacted upon NO in the gas, and 2O is taken out of 2NO to produce $N_2$ gas. In this contact reduction method, reaction at high temperatures is necessary. In a case where much oxygen remains in the exhaust gases, the reducing agents are consumed. There are also problems in that reducing NO into $N_2$ is difficult to effect, among other problems. According to the adsorption method, adsorbents such as activated charcoal, silica gel, etc. are used. The exhaust gas is brought into contact with the adsorbents to physically cause the nitrogen oxide to adhere to the adsorbents. This adsorption method has disadvantages in that the adsorption of NO is difficult, adsorption capacity being low, and adsorption efficiency being low especially at higher temperatures, among other disadvantages. According to the adsorption method, absorbents such as oxidation agent, chemical reaction agent, water, alkali solution, etc. are used. The absorbents are brought into contact with the gas to cause the absorbents to absorb the nitrogen oxide in the gas for removal thereof from the gas. This absorption method has disadvantages in that any apparatus used therefor must be large on a plantlike scale, and the absorbents have their own problems. For example, in using the oxidation agent, the reaction thereof is reliable. However, as the absorbents are higher in price, they must be reclaimed and recovered. Treatment of by-products is hard to effect. In a case where sulfuric acid is used as the chemical reaction agent, the process becomes complex, while in a case where ferrous-sulfate is used, oxygen remaining in the gas is apt to react more than the nitrogen oxide, whereby reaction of the nitrogen oxide is interfered with. Also, in a case where water and alkali solution are used, No is difficulty absorbed. Accordingly, a process of oxidizing the NO to $NO_2$ is required as a pretreatment. Furthermore, in case of water, high temperature gases of 100° C or more cannot be introduced.

Also, a majority of the conventional methods has been intended to remove nitrogen dioxide. In the exhuast gases from actual combustion, generation of nitrogen monoxide represents an overwhelming majority. Accordingly, removal of the nitrogen monoxide is more important. Therefore, conventionally, in order to remove the nitrogen monoxide, at first, the pre-processing for oxidizing NO into $NO_2$ is required to be effected. Thereafter, the adsorption and removal operation is effected by the adsorbents, or by the alkali aqueous solution. However, these methods are out of practice in that the removal capacity thereof is limited, and the apparatus therefor is bigger on scale.

Also, according to Japanese Patent Publication No. 10,048/1968, there is a method of removing the nitrogen oxide contained in the gases, which is dry and easy to use. This method comprises the steps of adhering one or more of $FeSO_4$, $(NH_4)_2SO_4$, $PdSO_4$, $KMnO_4$, $KClO_3$, $NaClO$, $NaClO_2$, $Na_2MoO_4$, $K_2S_2O_8$, $Na_2S_2O_2$, $Na_2HPO_4$, $Na_2O_2$, $AS_2O_3$, $CuCl_2$, and $IrCl_3$ onto activated aluminum porous carriers such as activated alumina, activated bauxite, activated silica alumina gel, etc., preferably by adhering them together with acid or alkali, and passing the gas containing the nitrogen oxide through the dried mixture as a packed layer thereby to remove the nitrogen oxide from the gas. However, this method is not sufficient in terms of removal rate and removal capacity.

It is a primary object of the present invention to provide compositions which have a high rate and capacity of removing nitrogen oxide, especially nitrogen monoxide, from gases, and to provide methods of removing the same. Namely, as the nitrogen oxide contained in the exhaust gas resulting from combustion is 80% or more nitrogen monoxide, such a higher removal rate and capacity are very useful in purifying the exhaust gas.

It is another object of the present invention to provide compositions and removal methods which can be of a dry type easy to use, and which are higher in removal rate and capacity with respect to nitrogen oxide, as a dry type. In constructing an exhaust gas purifying apparatus, this fact is helpful in simplifying the structure thereof.

It is a further object of the present invention to provide compositions and removal methods by which nitrogen oxide of a low concentration in the atmosphere or environment can be better removed. This is useful in purifying the air in places where many people gather such as waiting rooms, town halls, theaters, schools, etc., or in houses.

Namely, the present invention has been developed mainly with an object to purify exhaust gas from combustion, and indoor air. Especially, experiments have been effected for comparatively small combustors such as household boiler, gas water boiler, etc. as combusting apparatus. Accordingly, as the purifying apparatus is required to be simple in construction, easier to use, and lower in cost, the development thereof has been effected with particular stress on higher capability of the dry type of apparatus. However, the present invention can be applied even to a wet type of apparatus using a packed tower, etc.

The feature of the present invention is that the gas containing the nitrogen oxide is passed through a region where at least one of calcium sulfate and calcium hydroxide co-exist together with a powerful oxidation agent for oxidizing NO to $NO_2$ thereby to remove the nitrogen oxide in the gas. At this time, the powerful oxidation agent reacts not only with the NO in the gas, but also the $NO_2$ etc. to absorb them, and removes the nitrogen oxide from the gas. On the other hand, the calcium sulfate and/or the calcium hydroxide serve as a carrier for the powerful oxidation agent, and function to widen the contact area of the powerful oxidation agent with the NO, etc. due to their porosity and larger specific surface area. It seems that their own pH, etc. produce influences upon removal of the nitrogen oxide. It is effective to use sodium chlorite or potassium permanganate especially as the powerful oxidation agent. Concretely, various combinations such as calcium sulfate and sodium chlorite; calcium hydroxide and sodium chlorite; calcium sulfate, calcium hydroxide and sodium chlorite; calcium sulfate and potassium permanganate; calcium hydroxide and potassium permanganate; calcium sulfate, calcium hydroxide and potassium permanganate; and others are considered. Furthermore, it is also possible to add the other addition agent thereto. As embodiments, there are a dry method of mixing the calcium sulfate and/or the calcium hydroxide with the powerful oxidation agent thereby to constitute a gas permeable mixture such as a packed layer, porous body, etc. by use of a solid-like composition obtained through a proper process, and passing the gas through the gas permeable mixture; a method of using a fluid-like composition in which the above-mentioned composition has been suspended in water, etc. thereby to blow the gas into the fluidlike composition; a method of spreading a solution of the powerful oxidation agent on the packed layer composed of the calcium sulfate and/or the calcium hydroxide to pass the gas through the packed layer; and other methods. However, upon consideration of practicality such as easier operation, etc., the dry method is best suitable.

As described hereinabove, in removing the nitrogen oxide contained in the gas, it is a principal object to remove the NO. In order to remove the NO, there is generally employed an absorption method of reacting the NO upon the absorbents.

Accordingly, application of each kind of material as an absorbent of NO has been investigated. Namely, in order to develop a practical removal process concerning the absorption and removal method of the nitrogen oxide, the combination of absorption class and selection of the absorbent are very important. As the nitrogen oxide, there are nitrogen monoxide (NO), nitrogen dioxide ($NO_2$), nitrogen tetroxide ($N_2O_4$), dinitrogen trioxide ($N_2O_3$), dinitrogen pentoxide ($N_2O_5$), etc. However, from a stability point of view under normal conditions, it is the primary object to remove the nitrogen monoxide and the nitrogen dioxide which are highly stable. In a wet absorption by an aqueous solution, reaction of the water upon the nitrogen oxide is represented by the following reaction formulas.

$$2NO_2(\text{or } N_2O_4) + H_2O \rightleftarrows HNO_3 + HNO_2 \tag{1}$$

$$2HNO_2 \rightleftarrows H_2O + NO + NO_2 \text{ (or } \frac{1}{2} N_2O_4\text{)} \tag{2}$$

$$2NO + O_2 \rightarrow 2NO_2 \tag{3}$$

$$2NO_2 \rightleftarrows N_2O_4 \tag{4}$$

As the nitrogen oxide is hardly absorbed by water, oxidation of the nitrogen oxide is a rate determining step in the absorption and removal method by most aqueous solutions. Even in the actual absorption, there is a problem of how to improve the oxidation reaction speed. As the methods therefor, there can be enumerated on oxidation absorption method by catalytic oxidation, a vapor phase oxidation method using vapor phase oxidizing agents such as ozone, etc., a chemical reaction absorption method using a compound reactive upon the nitrogen monoxide, and other methods. If estimation in effected from the reaction formula, concerning a third method, the nitrogen monoxide is considered to allow the following reaction to be applicable.

a. reaction by sulfuric acid ($H_2SO_4$)

$$NO + H_2SO_4 = H_2SO_4 \cdot NO$$

b. reaction by chlorine ($Cl_2$) and ammonia ($NH_3$)

$$2NO + Cl_2 = 2NOCl$$

$$NOCl + 2NH_3 = NH_4Cl + N_2 + H_2O$$

c. reaction by sodium chlorite ($NaClO_2$)

$$4NO + 3NaClO_2 + 4NaOH = 4NaNO_3 + 3NaCl + 2H_2O$$

d. reaction by permanganate ($KMnO_4$)

$$2KMnO_4 + 2NO + K_2O = 2MnO_2 + 2HNO_3$$

e. reaction by ferrous sulfate ($FeSO_4$)

$$NO + FeSO_4 = Fe(NO)SO_4$$

Generally, such reaction formulas as described hereinabove are considered, but they only show reaction possibilities. Practically, the reaction speed thereof is important. Accordingly, the inventors have made laboratory tests to estimate the practical possibilities concerning approximately thirty kinds of materials including the above-mentioned materials. The materials $NaOH$, $Ca(OH)_2$, $Mg(OH)_2$, $KOH$, $Na_2CO_3$, $NaHCO_3$, $Na_2SO_4$, $NaHSO_3$, $Na_2S_2O_3$, $K_2SO_4$, $FeSO_4$, $NaClO$, $NaClO_2$, $NaClO_3$, $FeCl_2$, $Ca(OCl)_2$, $NaIO_4$, $NaIO_3$, $NH_4Cl$, $(NH_4)_2SO_4$, $NH_4SCN$, $NaSCN$, $H_2O_2$, $KMnO_4$, $KMnO_4 + NaOH$, $K_2Cr_2O_7$, $K_2Cr_2O_7 + H_2SO_4$. Solid materials have ben dissolved in water, etc. to a concentration of 2 to 5%.

Figure 1:
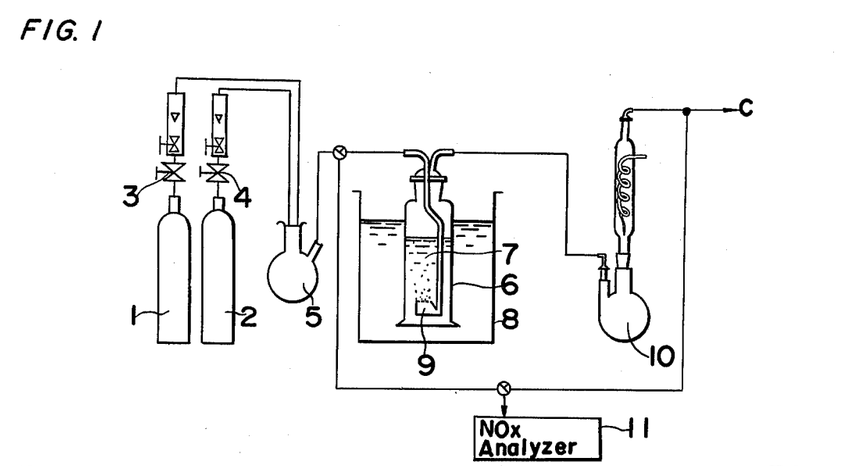
FIGS. 1 and 2 show a diagram of an experimental apparatus respectively.

In this case, the apparatus shown in FIG. 1 has been used. Numeral 1 is a $N_2$ bomb, numeral 2 being a NO bomb of 1,000 ppm in NO concentration. Numerals 3 and 4 show a valve of each bomb respectively. Numeral 5 is a mixer wherein $N_2$ and NO are mixed. Numeral 6 is an absorption bottle wherein absorption liquid 7 is accommodated. Numeral 8 is a water tank of constant temperature. Numeral 9 is a pipe which is dipped in the liquid 7 to effect bubbling operation, in the absorption liquid, of mixed gas from the mixer 5. Numeral 10 is a cooler for cooling a gas guided out from the bottle 6. Numeral 11 is an analyzer for measuring the concentration of NOx. The NOx concentration of the gas which enters the absorption bottle 6 and the NOx concentration of the gas which has come out of the absorption bottle 6 are measured by the NOx analyzer 11 to investigate how much NOx has been absorbed and removed by the absorption liquid 7. In the apparatus illustrated above, the NO gas is diluted in the $N_2$ gas and is introduced into the absorption liquid 7 in the absorption bottle 6 for bubbing operation thereof. The experimental conditions are as follows.

Absorption liquid capacity: 400 (ml)
Absorption liquid temperature: 30 (° C)
Gas flow: 1.0 (1/min)
NO concentration at entrance: 90 (ppm)

Figure 3:
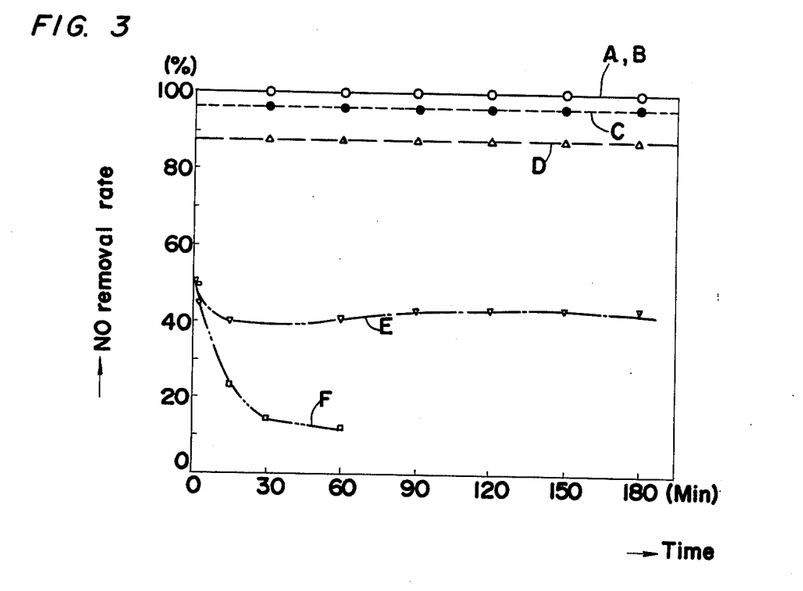
FIGS. 3 and 4 are graphs each showing variations in NO removing rate of each kind of absorption liquid as time lapses.
Figure 4:
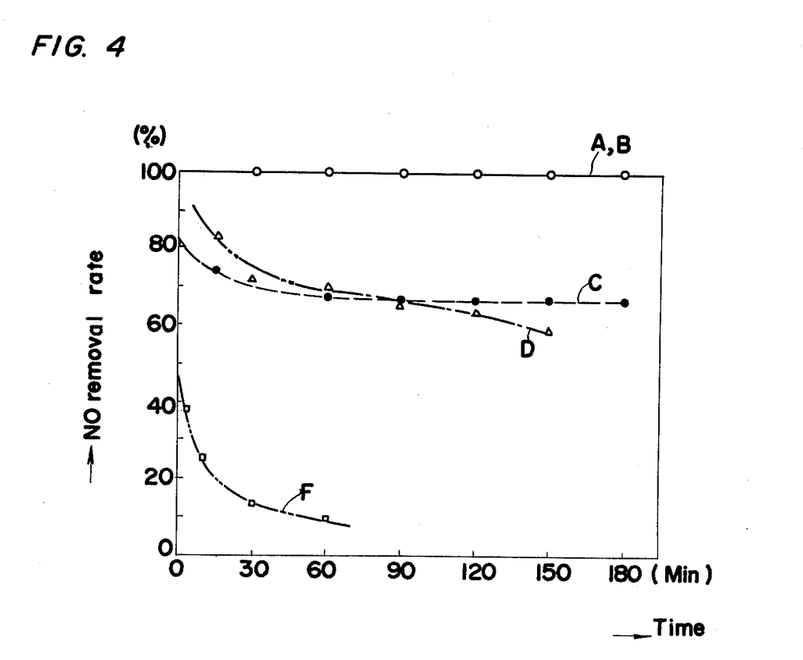
Figure 5:
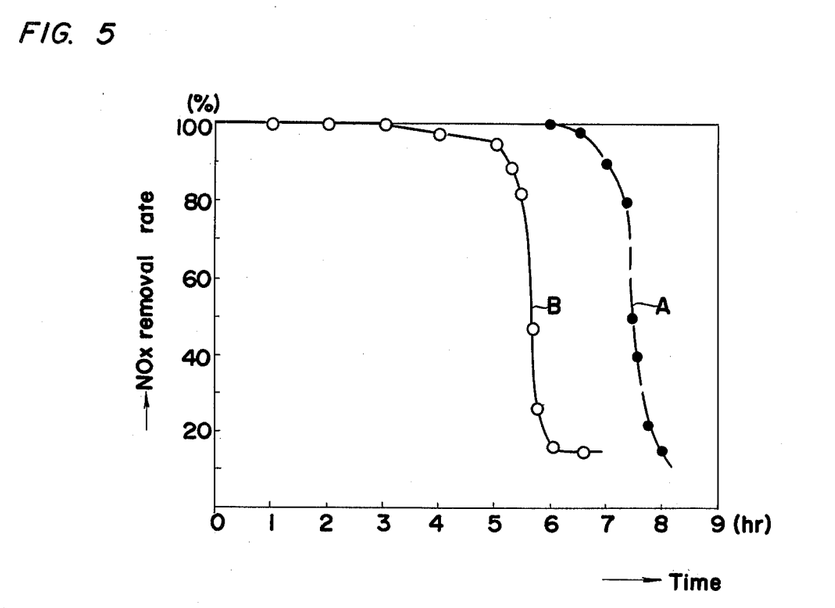
FIG. 5 is a graph showing service life test results of an absorption liquid which is especially superior in removal efficiency.

In this experiment, a Kelminex method (Yanagimoto Manufactory of Japan, Yanaco ECL-7S) has been used to analyze the NOx of the nitrogen oxide. The results are shown in FIGS. 3 and 4 respectively. FIG. 3 shows the results at 30° C, and FIG. 4 the results at 50° C. Referring to FIGS. 3 and 4, reference character A shows a feature of a mixed liquid between $K_2Cr_2O_7$ and $H_2SO_4$, reference character B showing that of a 5% aqueous solution of $NaClO_2$, reference character C showing that of a 2% aqueous solution of $KMnO_4$, reference character D showing that of an aqueous solution of $KMnO_4(2\%)$ and $NaOH(4\%)$, reference character E showing that of a mixed liquid of $K_2Cr_2O_7$, $H_2SO_4$ and $H_2O$, reference character F showing that of a 51% aqueous solution of $NaClO$. Materials except those shown are completely free of removal capability, or have been reduced in such capability in an extremely short time. From FIGS. 3 and 4, it is apparent that the 5% solution of $NaClO_2(B)$, and $K_2Cr_2O_7 + H_2SO_4(A)$ are particularly superior, having a 100% removal rate for a long period. Results of service life testing concerning A and B are shown in FIG. 5. The experiments have been effected under the following conditions:

NO concentration at entrance: 980 (ppm)
Absorption liquid capacity: 50 (ml)
Gas flow: 1 (1/min)
Absorption liquid temperature: 30 (° C)

According to the comparison between FIGS. 3 and 4, the results show that higher temperatures of the absorption liquid produce inferior absorption efficiency. Perhaps, this is because, in the absorption reaction (formulas 1 to 4 described above) of the nitrogen oxide upon the water, the cracking reaction of nitrous acid (formula 2) is accelerated due to temperatures.

According to the results of FIGS. 3 and 4, from a reaction speed point of view, the absorbents, in aqueous solution, are powerful oxidation agents, and the absorbent, which is considered to participate in the direct reaction with the NO or the oxidation reaction therewith, shows its superior nitrogen oxide removal capability. If screening is effected in these powerful oxidation agents from poison handling and safety points of view, both $NaClO_2$ and $KMnO_4$ are necessarily chosen. From the results of FIGS. 3 and 4, $K_2Cr_2O_7 + H_2CO_4$ solution is superior in NO removal efficiency, but causes problems in safety and other points. Thus, it is not practical. Both $NaClO_2$ and $KMnO_4$ are considered to be superior in NO removal efficiency, since the chemical reactions shown in $c$ and $d$ above proceed extremely quickly, together with the oxidation reaction of the NO. As moisture normally exists even in the combustion exhaust gases, and the normal indoor environment, it is possible to apply the concept of the conventionally known wet absorption method to this new dry absorption method.

From this expression, a dry absorption composition with sodium chlorite ($NaClO_2$) or potassium permanganate ($KMnO_4$) used as the main component has been examined construction. At first, mixture with the other materials wherein $NaClO_2$ is used as a main component of the mixture has been examined in two kinds of methods. One of them is a method of impregnating the $NaClO_2$ with the other material as a carrier, and the other method is a method of mixing and scouring the other material with $NaClO_2$. The former impregnation method is a method which has been embodied partly in the aforesaid Japanese Patent Publication No. 10,048/1968, etc. However, the latter mixing and scouring method is unprecedented. The present inventors have examined through comparisons a two component class of the $NaClO_2$ and the other material in the impregnation method, and the mixing and scouring method respectively. Materials which have been examined through comparisons by the impregnation method and the mixing and scouring method are in the following groups.

Activated charcoal, various molecular sieves, silica gel, activated alumina, dryerite, soda lime, plaster of Paris, bentonite, slaked lime, quick lime, calcium chloride.

The first six kinds of materials among the abovementioned materials are known normally as the absorbents. However, according to the results wherein they have been examined individually, they have proved to be free from NO removal capability at all.

Figure 2:
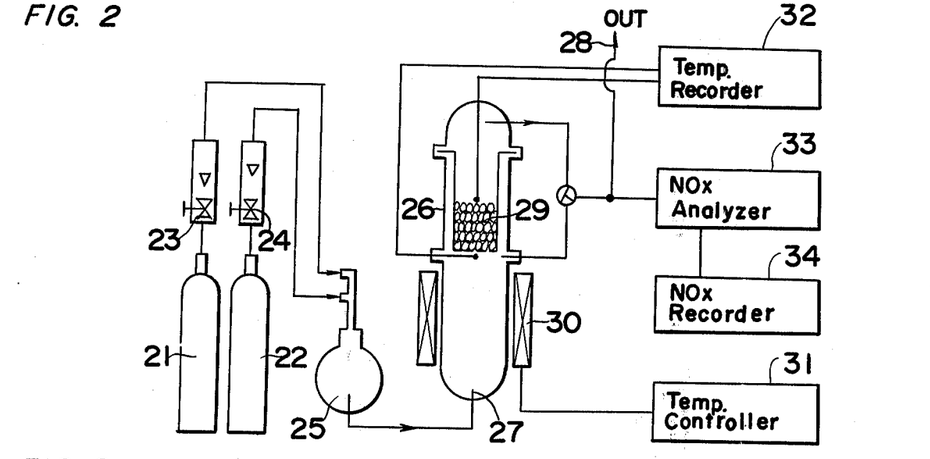

In this case, the apparatus shown in FIG. 2 has been used. Referring to the drawing, numeral 21 is a $N_2$ bottle. Numeral 22 is a NO bomb of 1,000 ppm in NO concentration. Numerals 23 and 24 show a valve of each bottle. Numeral 25 is a mixture wherein $N_2$ gas and NO gas are mixed. Numeral 26 is a quartz glass reactor which guides from an entrance 27 the mixed gas from the mixer 25 thereby to react upon samples 29 filled therein. Numeral 28 is an exit of the gas from the reactor 26. Numeral 30 is a heater for heating the reactor 26. Numeral 31 is a temperature controller which controls current flowing to the heater 30 to keep the temperature of the reactor 26 constant. Numeral 32 is a temperature recorder. Numeral 33 is an analyzer for measuring the concentration of the nitrogen oxide NOx. Numeral 34 is its recorder. In this apparatus, the NO gas of 1,000 (ppm) is diluted in $N_2$, and is mixed sufficiently by the mixer 25, and then is introduced into the reactor 26. The NOx concentration of the gas which has entered the reactor 26, and the NOx concentration of the gas which exits the reactor 26 are measured by the analyzer 33 to investigate the NOx removal efficiency of the samples 29. This has been carried out under the following conditions.

Temperature of adsorption layer 29: 30, 50, 100 (° C)
Adsorption layer volume: 20 (ml)
Gas flow: 5.5 (l/min)
Space Velocity (SV value): 16,500 ($h^{-1}$)

Classes wherein sufficient capabilities for removing the nitrogen monoxide have been obtained are as follows:

1. in a case where 5% $NaClO_2$ aqueous solution has been impregnated into plaster of Paris ($CaSO_4 \cdot \frac{1}{2} H_2O$),
2. in a case where 50% $NaClO_2$ solution has been impregnated into activated alumina,
3. in case where plaster of Paris ($CaSO_4$) and $NaClO_2$ have been mixed and scoured in the rate of three to two, and
4. in a case where slaked lime [$Ca(OH)_2$] and $NaClO_2$ have been mixed and scoured at the rate of three to two.

Figure 6:
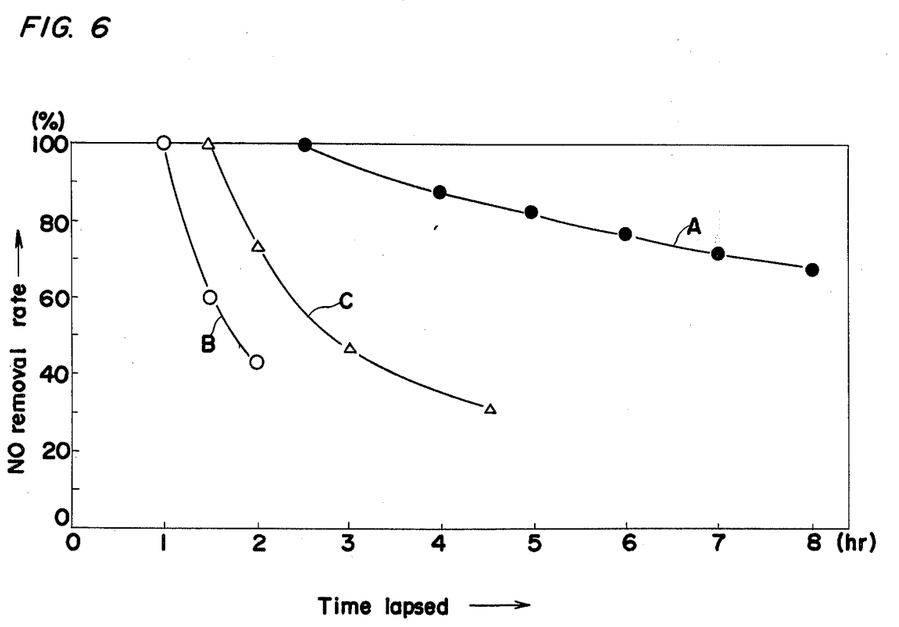
FIG. 6 is a graph showing comparisons of NO removing rate in a case where an $NaClO_2$-containing composition of the present invention and the conventional composition are applied to a combustion exhaust gas.
Figure 7:
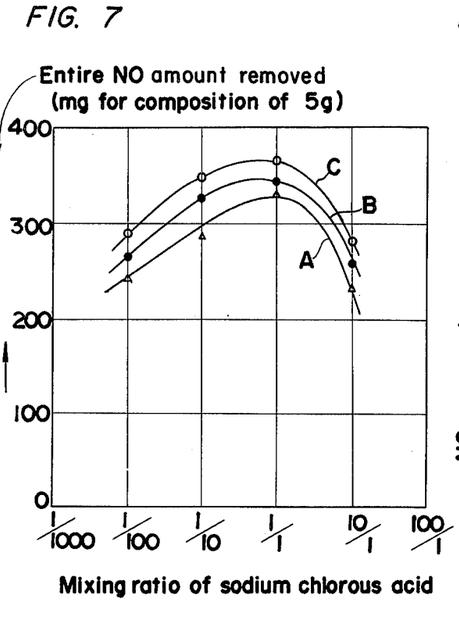
FIGS. 7, 8 and 9 are graphs concerned with $NaClO_2$ and showing results as to how NO removal efficiency changes with changes in each kind of composition.
Figure 8:
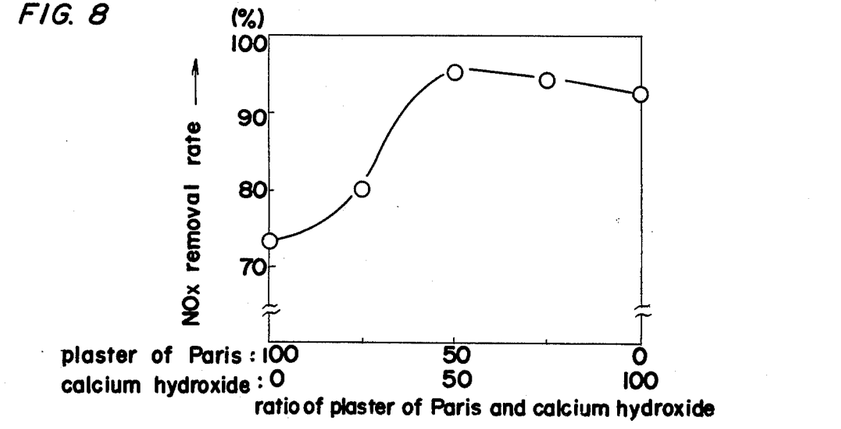
Figure 9:
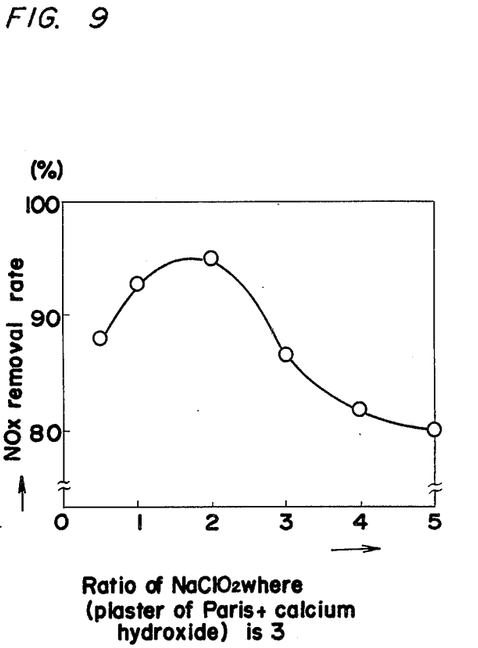

There are intrinsic optimum compositions relative to the impregnation concentration of $NaClO_2$ and mixing scouring ratio thereof in the four kinds of construction. The values shown herein have proved to be compositions by which the highest capabilities thereof are obtained. FIG. 6 shows the capability comparisons. In the experiment of FIG. 6, the exhaust gas (NO: 170 ppm) resulting from propane gas burnt by means of a Bunsen burner has passed under space velocity of SV = 12,000 $hr^{-1}$ and temperature of 200° C. Referring to FIG. 6, A shows features of paster of Paris and $NaClO_2$ mixed and scoured in the rate of three to two (weight ratio), B features of the plaster into which $NaClO_2$ 5% aqueous solution has been impregnated, C the features of activated alumina into which $NaClO_2$ 50% aqueous solution has been impregnated. As apparent from FIG. 6, the mixing and scouring class A between the plaster of Paris and the sodium chlorite has very superior NO removal capabilities as compared to the conventional impregnation type C. FIG. 7 shows effects applied upon the time lapse variations of the NO removal rate in a case where the mixing ratio has been changed in three kinds of mixing and scouring operations, namely class A of plaster of Paris (namely, calcium sulfate) and sodium chlorite, class B of slaked lime (namely, calcium hydroxide) and sodium chlorite and class C of plaster of Paris, slaked lime and sodium chlorite. The mixing ratios are all shown in weight ratio. As apparent from FIG. 7, in the plaster of Paris/sodium chlorite class A, it is desirable that the mixing ratio of the plaster of Paris/sodium chlorite is in the range of 100/1 to 1/10. Likewise, even in the slaked lime/sodium chlorite class B, it is desirable that the mixing ratio of the slaked lime/sodium chlorite is in the range of 100/1 to 1/10. Also, the three-component mixing and scouring class C of the plaster of Paris/slaked lime/sodium chlorite has much better NO removal capability than the two-component class. FIGS. 8 and 9 show the effects of the composition ratio upon the NO removal rate concerning the three-component mixing and scouring system of the plaster of Paris/slaked lime/sodium chlorite. In FIG. 8, (plaster of Paris + slaked lime): $NaClO_2$ is fixed to 3:2, and the mixing percentage of the plaster of Paris and the slaked lime is changed. In FIG. 9, the plaster of Paris:slaked lime is fixed to 1:1, and the sodium chlorite is changed with plaster of Paris + slaked lime as 3. Entrance concentration of te gas introduced is NO = 85 ppm, space velocity being SV = 16,500 $hr^{-1}$, and temperature being 30° C. & It has been found that the highest capability is obtained in the composition of 3/3/4 by weight ratio as the composition ratio of plaster of Paris/slaked lime/sodium chlorite. As apparent from these, the mixing ratio in a case where the calcium hydroxide and the calcium sulfate are mixed is optional in the three-component class C. The mixing ratio between the sodium chlorite and a mixture of the calcium hydroxide and the calcium sulfate is desirable to be in the range of 100/1 to 1/10 by weight.

An aqueous solution of sodium chlorite reacts upon nitrogen monoxide as shown in the following formula.

$$4NO + 3NaClO_2 + 4NaOH = 4NaNO_3 + 3NaCl + 2H_2O$$

At this time, the calcium sulfate and the calcium hydroxide serve as a carrier for carrying the sodium chlorite and act to improve the contact efficiency of the sodium chlorite and NO due to larger specific surface area. Also, especially the calcium hydroxide is alkaline, and is considered to absorb and remove the $NO_2$ of an intermediate product which has not been reacted sufficiently by reaction of the sodium chlorite and NO.

Figure 10:
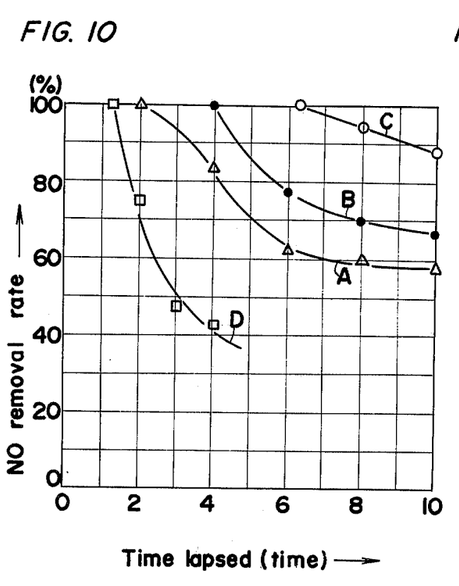
FIG. 10 is a graph showing the NO removing rate in a case where the $NaClO_2$-containing composition of the present invention is applied to a combustion exhaust gas.

FIG. 10 shows the results of the capability for removing NO through application of the composition of the present invention to combustion exhaust gas. The exhaust gas produced by burning of propane gas by means of a Bunsen burner is brought into contact with the composition of the present invention under conditions of SV = 12,000 ($hr^{-1}$) and packed layer temperature of 200 (°C). The NOx concentration in the exhaust gas is 180 (ppm), and the NO accounts for 95% or more thereof. Referring to FIG. 10, A shows the calcium sulfate and the sodium chlorite mixed in the rate of three to two by weight ratio, B showing the calcium hydroxide and sodium chlorite mixed in the rate of three to two, C showing the calcium hydroxide, the calcium sulfate, and the sodium chlorite mixed in the rate of three to four. And, D is the feature of the conventional example wherein a 50% aqueous solution of the sodium chlorite has been impregnated into activated alumina. Furthermore, A, B and C are used wherein each component is blended, mixed and scoured with addition of water, moulded into proper shape, dried, crushed and sifted out into 6 to 8 mesh. As apparent from FIG. 10, the A, B and C of the present invention have remarkably superior NO removing capabilities as compared with the conventional composition D.

Figure 11:
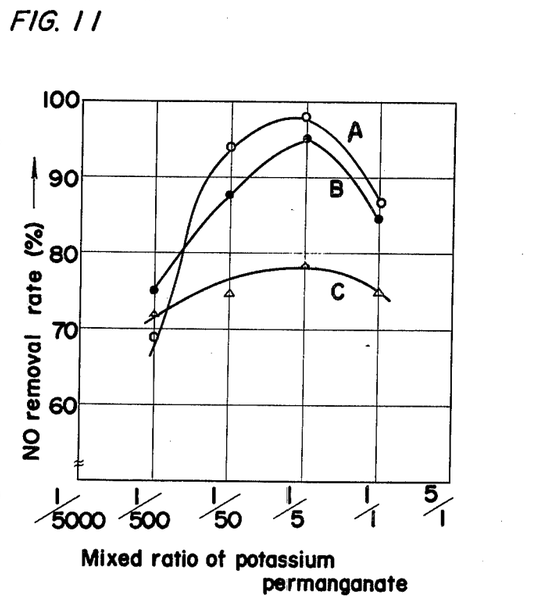
FIG. 11 is a graph concerned with $KMnO_4$ and showing results as to how the NO removal efficiency changes with changes in each kind of composition.

The relationship between the mixing ratio and the NO removal ratio has been examined for $KMnO_4$/$CaSO_4$, $KMnO_4$/$Ca(OH)_2$ and $KMnO_4$/$Ca(OH)_2$ composition relative to $KMnO_4$. The results thereof are shown in FIG. 11. Referring to FIG. 11, A shows a class of KMnO$_4$/Ca(OH)$_2$/CaSO$_4$, B showing a class of KMnO$_4$/Ca(OH)$_2$, C showing a class of KMnO$_4$/CaSO$_4$. The NO concentration of the gas used is 85 ppm, the space speed SV being 17,000 hr$^{-1}$, the temperature being 30° C. In FIG. 11, it is desirable that the mixing ratio of potassium permanganate and calcium sulfate shown by C is a ratio of 1/500 to 1/1 by weight if 70% initial removal ratio is desired, the mixing ratio of the potassium permanganate and calcium hydroxide shown by B being a rate of 1/400 to 1/1, the mixing ratio of potassium permanganate with the mixture of calcium hydroxide and calcium sulfate shown by A being a ratio of b 1/500 to 1/1 (the mixing ratio of calcium hydroxide and calcium sulfate is optional).

Figure 12:
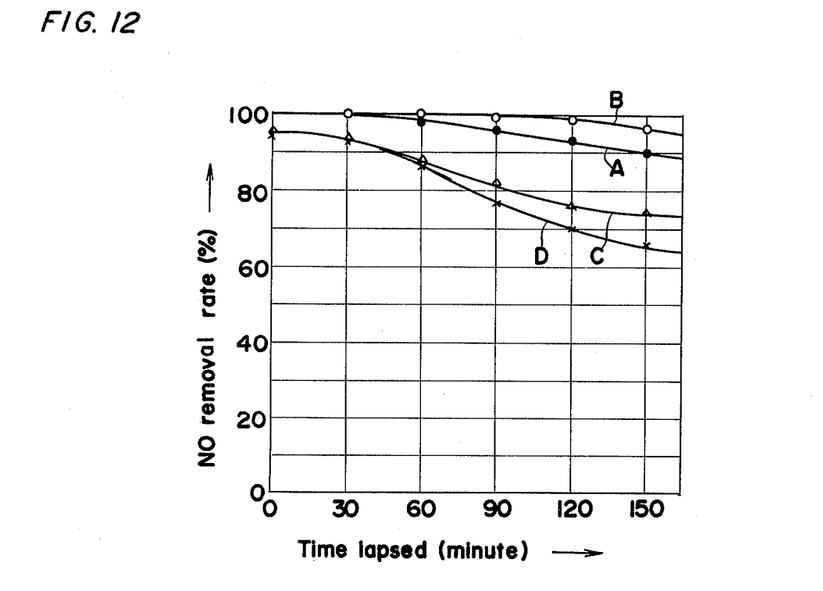
FIG. 12 is a graph showing the NO removal rate in a case where the $KNmO_4$-containing composition of the present invention is applied to the combustion exhaust gas.
Figure 13:
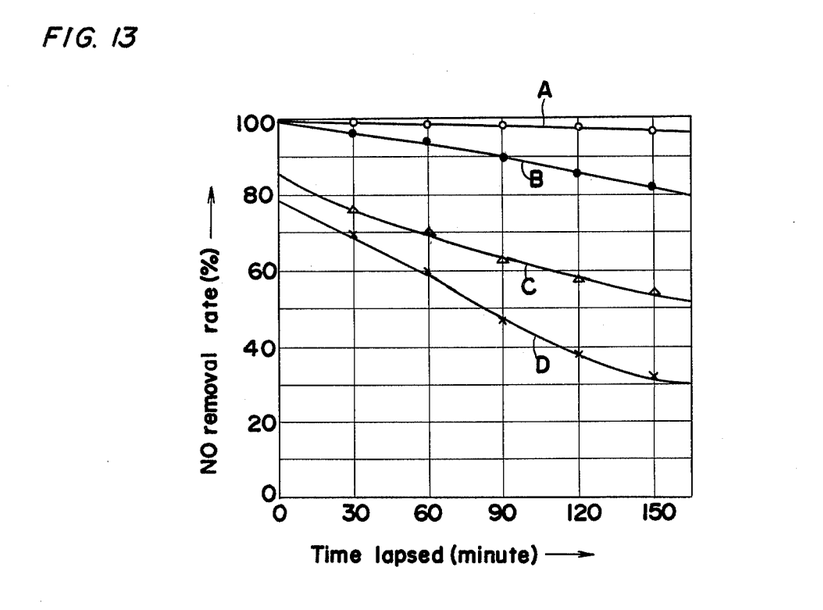
FIG. 13 is a graph showing variations in NO removal rate with time lapse, centered on $KMnO_4$.

FIG. 12 shows the NO removal capability in a case where each composition of A, B and C shown in FIG. 11 has been applied to combustion exhaust gas. Also, D in FIG. 12 represents the conventional composition wherein a 5% KMnO$_4$ solution has been impregnated into activated alumina carrier. In this experiment, the exhaust gas produced by burning propane gas by use of a Bunsen burner has been passed in contact with the packed layer of the composition under the conditions of space velocity SV = 12,000 (hr$^{-1}$). The NO concentration of the exhaust gas has been 180 (ppm), the packed layer temperature 200 (°C). Also, FIG. 13 shows results of the NO removal rate obtained with the compositions A, B, C and D by contacting the nitrogen monoxide of 85 ppm with the compositions, the nitrogen monoxide being nitrogen-balanced and containing saturated steam at a temperature of 30° C under the conditions of space velocity SV = 17,000 (hr$^{-1}$). It is apparent from FIGS. 12 and 13 that the comositions A, B and C of the present invention are superior in NO removal capability as compared with the conventional composition D. Also, among the compositions A, B and C, the calcium hydroxide mixing and scouring classes A and B are provided with better performance than the calcium sulfate mixing and scouring class C. Comparison betwen FIGS. 12 and 13 shows that each composition A to C is better in NO removal rate if it is used for application to exhaust gas. Namely, this shows that the composition of the present invention is more practical.

As described hereinabove, the aqueous solution of the potassium permanganate is considered to react upon NO as follows.

$$2KMnO_4 + 2NO + H_2O + K_2O + 2MnO_2 + 2HNO_3$$

The calcium sulfate and the calcium hydroxide are considered to serve to carry the KMnO$_4$ to act to absorb, as alkali, the NO$_2$ existing in the reaction, although this is not clear, or to act to adsorb it.

In order to make the compositions of the present invention suitable for practical use, it is necessary to granulate them in large quantities in stable quality and shape. There are generally enumerated crushing granulating, extruding granulating, transiting granulating, bricketing, etc. In the compositions of the present invention, the granulating method is restricted to a special one in order to exhibit sufficient efficiency thereof. In the compositions of the present invention, the extruding method, among the granulating methods, is most desirable. In extruding granulating, the following steps are preferable as a process to retain the compositions of the present invention at a high level of performance.

(1) mixing of materials → (2) grinding →
(3) kneading → (4) extruding → (5) drying The reason why the extruding granulating is preferable as the granulating method is based on the accumulation of experimental data obtained through actual comparison, in NO removal capabilities, of products made by each kind of granulating method. Table 1 shows one portion of the data. Each method has used the calcium hydroxide, calcium sulfate, and sodium chlorite mixed in a ratio of three to three to four by weight. The NO concentration of the gas used is 1,000 ppm, the space velocity SV being 16,000 hr$^{-1}$. The removal ratio of the NOx in the table is an average value of fifteen minutes from its initial stage. In the extruding granulating wherein a mixed solvent of water (H$_2$O)/ethanol (C$_2$H$_5$OH) is used as a binder, as apparent from Table 1 superior NO removal capability is obtained. In the crushing granulating, unfavorable rate of produce yield is particularly a problem. Accordingly, this is unacceptable as an industrial method. Also, in the bricketing method, the feature of the materials themselves becomes a problem in terms of fluidity and lubricating, thus resulting in difficult mass production.

Table I

| granulating method | granulating conditions binder | granulating conditions others | NO removing rate (%) (initial stage) NO removing rate | NO removing rate (%) (initial stage) NOx removing rate | specific surface area (m$^2$/g) |
|---|---|---|---|---|---|
| | H$_2$O | kneader period: 5 min. | 10 | 7 | 1.33 |
| extruding type granulating | $\frac{H_2O}{C_2H_5OH} = \frac{1}{1}$ | grinding performed kneader period: 15 min. | 100 | 75 | 7.58 |
| | H$_2$O | kneader period: 5 min. | 10 | 7 | 2.22 |
| transiting type granulating | $\frac{H_2O}{C_2H_5OH} = \frac{1}{1}$ | kneader period: 5 min. | 50 | 32 | 2.43 |
| | H$_2$O | kneader period: 15 min. | 20 | 15 | 6.04 |
| crushing type granulating | $\frac{H_2O}{C_2H_5OH} = \frac{1}{1}$ | kneader period: 15 min. | 100 | 63 | 4.66 |
| bricketing | filler material such as magnesium stearate etc. | | 100 | 65 | 7.20 |

Table I-continued

| granulating method | granulating conditions | | NOx removing rate (%) (initial stage) | | specific surface area (m²/g) |
|---|---|---|---|---|---|
| | binder | others | NO removing rate | NOx removing rate | |
| | is used | | | | |

Figure 14:
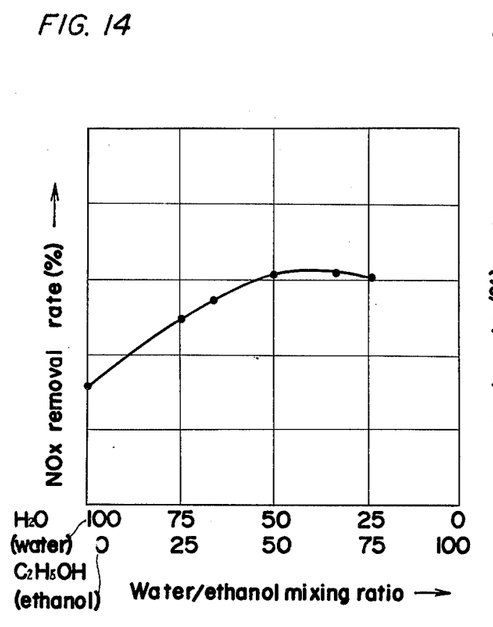
FIG. 14 is a view showing results as to how the mixing ratio of water and ethanol produces effects upon the NOx removal in order to estimate the aptitude as a binder for extrusion granulating operation.

Particularly, when only water has been used as a binder to be added in the kneading process, the desired capability is difficult to obtain. Accordingly, it is necessary to adopt the mixed solvent of water/alcohol. FIG. 14 shows the variation of the NOx removal capability when the mixing ratio (capacity ratio) of the water and the ethyl alcohol has been changed. The gas used here is 100 ppm in NO concentration with NO and air being balanced, and the space speed $SV = 5 \times 10^4$. Each measured value is a 15 minutes' average value from the initial stage. It is apparent from FIG. 14 that the ethanol improves the capability thereof. However, actually, it is most desirable that the mixing ratio of the water-/ethyl alcohol is near 1/1 by capacity ratio.

Although the requirement of the grinding process is related to the material grain size used, the capability thereof is improved if the grinding process is provided. The effects of the grinding process upon the NOx removal capability are shown in Table 2. The calcium hydroxide, calcium sulfate and sodium chlorite composition mixed at a ratio of three to three to four by weight ratio has been used in all cases. The measuring conditions are the same as in Table 1.

Table 2

| No. | extruding conditions | | | NOx removal rate (initial stage) | | specific surface area (m²/g) |
|---|---|---|---|---|---|---|
| | binder | kneading period (min.) | grinding by hammer mill | NO | NOx | |
| (1) | water/ ethanol = 1/1 | 2 | no | 100 | 79 | 5.97 |
| (2) | " | 15 | no | 100 | 82 | 3.77 |
| (3) | " | 2 | yes | 100 | 84 | 6.11 |
| (4) | " | 15 | yes | 100 | 89 | 8.07 |

From the results of Table 2, it is apparent that the grinding process, in the extruding granulating process for the compositions of the present invention, provides favorable results to capability improvement. The reasons why the grinding process improves the NOx removal capability, and the extruding granulating is best as the granulating method, are considered to be as follows. One of the reasons is that the difference in the specific surface area obtained is involved as shown in Tables 1 and 2. Namely, it is advantageous during reaction if the specific surface area is larger. Furthermore, although it is an estimate, the patterns of pore distribution of the granulated products are different (in two or three examples actually measured such distributions have been different), depending upon the granulating method and the granulating conditions. When gas and solid have been brought into contact with and reacted upon each other on a fixed bed, differences are caused in the diffusion of the NOx content into the granulated products and thus the reactivities thereof are different. These differences are considered to have influences upon the facts described hereinabove. Furthermore, reactivities, these influences upon the activity itself, and other factors are considered to have influence upon the facts described hereinabove.

Figure 15:
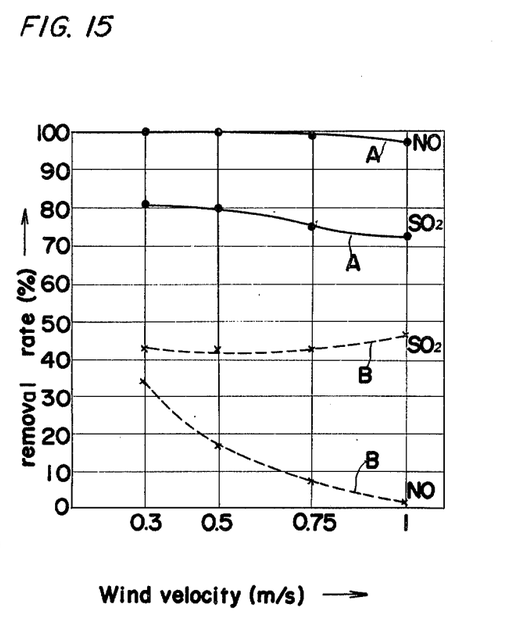
FIG. 15 is a graph showing correspondence of the NO and $SO_2$ removing efficiency to wind speeds in a case where the composition of the present invention is used as an air purifying filter.

FIG. 15 shows the comparison of features of the NOx removal capabilities with those of the conventional example, the extruding granulated products of the compositions of the present invention being constituted as air purifying filters. In all cases, the filter is 15 mm thick, and the area is 0.09 m². The gas used is about 1 ppm in NO concentration, and is about 1 ppm in SO₂ concentration. These removal rates have been measured by changing the blowing amount. The product A of the present invention uses the composition mixed at a ratio of three to three to four (weight ratio) of $Ca(OH)_2$, $CaSO_4$ and $NaClO_2$ and is granulated into pellet shape of 2.5 mm in diameter by the extruding process described hereinbefore. As the granulating conditions, the grinding is performed, the binder of the water/ethanol = 1/1 being used, the kneading period being 15 minutes. The conventional product B used activated charcoal. As shown in FIG. 15, the composition of $Ca(OH)_2/CaSO_4/NaClO_2$ 3/3/4 can remove sulfurous acid gas $SO_2$, in addition to NO, and has superior removal capabilities. From an air cleaning point of view, removal of the sulfurous acid gas has been an important demand. Accordingly, the present product can satisfy the requirements sufficiently.

Also, the composition of the present invention may be constituted as a filter by being carried on a porous structure. As the porous structure used therefor, there can be enumerated assemblies of fine wires such as glass wool, stainless, etc. In structure, it is possible to realize the construction such as net shape, honey comb shape, ball shape, etc. In any event, it is desirable to have very porous construction. There are many ways of carrying the composition onto the porous construction member. For example, in case of the $Ca(OH)_2/CaSO_4/NaClO_2$ composition, there are two methods, one method wherein the calcium sulfate and the calcium hydroxide are subjected to hydration and kneading in advance and rendered fluid, being applied and dried on the porous construction member, thereafter being brought into contact with an aqueous solution or a suspension of the sodium chlorite to impregnate the sodium chlorite. The other method is one wherein a third member is applied in a fluid condition after hydration and kneading. The latter is more preferable than the former, because the adhesion amount of the sodium chlorite onto the porous construction member is more in the latter. Such composition of the present invention carried on the porous construction member has advantages in that there is a smaller loss of pressure, which is extremely advantageous, in the case of applying air filtration to a lower extent. Secondly, sufficient mechanical intensity is ensured. Thirdly, NO removal capabilities can be improved by possible increase of the specific surface area up to approximately ten times as much by combination of the present composition with the construction member, although the composition of the present invention is on the order of 10 (m²/g).

Figure 16:
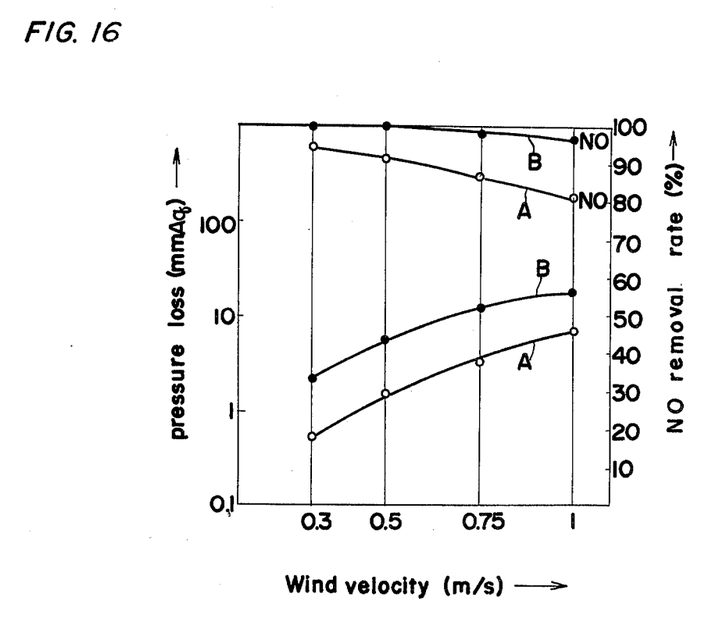
FIG. 16 is a graph showing correspondence of NO removal efficiency and pressure loss to wind speeds in a case where the composition of the present invention is carried on a gas permeable construction member to serve as a filter.

An embodiment of this feature of the invention will now be described. As the porous construction member, a urethane blister member is used. A filter wherein a mixture in fluid condition, in which $Ca(OH)_2/CaSO_4/NaClO_2 = 3/3/4$ (weight ratio) is subjected to hydration and kneading, is adhered onto the urethane blister member. FIG. 16 shows the features of the filter. In the graph, reference character A is the feature of the filter, reference character B being the feature of the packed layer which is composed of the granulated products wherein the composition has been formed into pellet shape of 2.5 mm in diameter. The filter is 15 mm in thickness, and the area is 0.09 m². The gas of approximately 1 ppm in NO concentration is used. The filter A is slightly lower in NO removal rate as compared with the packed layer B, but is characterized as having smaller pressure loss. For example, in adding harmful gas-removing capabilities to an air conditioner for cooling and heating, the cooling and heating capabilities are not damaged comparatively by use of the filter. As a composition of the sodium chlorite has been used for cleaning indoor air, and has been brought into contact with a large amount of air, some chlorine smell may be noticeable. This becomes a big disadvantage when air purification is desired. Accordingly, a countermeasure against the chlorine is compulsory in this instance. As the countermeasure, a chlorine removing agent may be used. The examples where activated charcoal has been used are shown in Table 3.

NO removal capability. The combination thereof with the activated charcoal is preferable not only for prevention of the chlorine smell, but also for improvement of the NOx removal capability.

As described hereinabove, the present invention results in a greater rate of and capability for removing nitrogen oxide from gas, particularly, nitrogen monoxide. Therefore, cleaning of the waste gas produced by burning can be improved remarkably. Furthermore, the composition of the present invention can be in the form of a packed layer or can be carried on a porous construction member. Accordingly, it can easily be of a dry type, and is convenient in use. As construction of the gas cleaning apparatus can be simplified, the present invention is very useful. Furthermore, since even nitrogen oxide of low concentration in the atmosphere or environment can be better removed, the present invention is very helpful for cleaning the air.

What is claimed is:

1. A dry method of purifying a gas containing nitrogen monoxide, nitrogen dioxide or a mixture thereof, which comprises passing the gas through a kneaded and granulated composition containing calcium hydroxide, sodium chlorite and calcium sulfate.

2. A method according to claim 1, which further comprises passing the gas, which has passed through the composition, through a chlorine-removal agent.

3. A method according to claim 1, wherein the composition is in the form of a packed layer of granules.

4. A method according to claim 1, wherein the composition is carried on a porous carrier.

Table 3

| filter construction | NOx removal capability | | chlorine concentration analyzed by O-tolidime method | existence of smell |
|---|---|---|---|---|
| | NO removal rate | NOx removal rate | | |
| $CaSO_4/NaClO_2 = 2/3$ | 100 | 68 | 5 p.p.m. | yes |
| $Ca(OH)_2/NaClO_2 = 2/3$ | 100 | 70 | 1 p.p.m. | yes |
| $CaSO_4/Ca(OH)_2/NaClO_2 = 3/3/4$ | 100 | 85 | 0.5 p.p.m. | yes |
| combination of activated charcoal with $CaSO_4/Ca(OH)_2/NaClO_2$ | 100 | 95 | not detected | no |

Combination thereof with a removing agent which is composed of alkali, etc. such as sodium carbonate, without the activated charcoal is possible to use. As apparent from FIG. 3, when it has been combined with the activated charcoal, NOx removal capability is further improved due to the multiplication effect of the present composition with the activated charcoal, since the activated charcoal is also comparatively superior in 5. A method according to claim 1, wherein the weight ratio of calcium hydroxide to sodium chlorite is from 100:1 to 1:10.

6. A method according to claim 1, wherein the weight ratio of sodium chlorite to (calcium hydroxide + calcium sulfate) is from 100:1 to 1:10.

* * * * *